US008909947B2

(12) United States Patent
Achariyakosol et al.

(10) Patent No.: US 8,909,947 B2
(45) Date of Patent: Dec. 9, 2014

(54) SYSTEM AND METHOD FOR REMOTE USE OF INFORMATION HANDLING SYSTEM AUDIO COMPONENTS

(75) Inventors: Art Achariyakosol, Austin, TX (US); David Konetski, Austin, TX (US); Douglas Peeler, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 2441 days.

(21) Appl. No.: 11/536,039

(22) Filed: Sep. 28, 2006

(65) Prior Publication Data

US 2008/0082838 A1   Apr. 3, 2008

(51) Int. Cl.
*G06F 1/00* (2006.01)
*G06F 1/26* (2006.01)
*G06F 3/16* (2006.01)
*G06F 1/32* (2006.01)

(52) U.S. Cl.
CPC .. *G06F 1/32* (2013.01); *G06F 3/16* (2013.01); *G06F 1/3287* (2013.01); *Y02B 60/1282* (2013.01); *Y02B 60/32* (2013.01); *Y02B 60/1278* (2013.01)
USPC ................... 713/300; 713/1; 713/2; 713/322; 713/323; 713/324; 713/400

(58) Field of Classification Search
USPC .................. 713/1, 2, 322, 400, 300, 323, 324
See application file for complete search history.

(56) References Cited

U.S. PATENT DOCUMENTS

| 6,006,285 | A | * | 12/1999 | Jacobs et al. | 710/14 |
|---|---|---|---|---|---|
| 6,088,809 | A | * | 7/2000 | Atkinson | 713/324 |
| 6,266,714 | B1 | * | 7/2001 | Jacobs et al. | 710/14 |
| 6,385,734 | B2 | | 5/2002 | Atkinson | 713/324 |
| 6,502,003 | B1 | | 12/2002 | Jacobs et al. | 700/95 |
| 6,675,233 | B1 | * | 1/2004 | Du et al. | 710/14 |
| 7,055,049 | B2 | | 5/2006 | Atkinson | 713/324 |
| 7,103,381 | B1 | * | 9/2006 | Wright et al. | 455/557 |
| 7,149,692 | B1 | * | 12/2006 | Wu | 704/270 |
| 7,298,765 | B2 | * | 11/2007 | Ganton et al. | 370/537 |
| 7,526,349 | B2 | * | 4/2009 | Chan et al. | 700/94 |
| 2008/0228969 | A1 | * | 9/2008 | Cheah et al. | 710/69 |

* cited by examiner

*Primary Examiner* — Paul Yanchus, III
*Assistant Examiner* — Zahid Choudhury
(74) *Attorney, Agent, or Firm* — Terrile, Cannatti, Chambers & Holland, LLP; Robert W. Holland

(57) ABSTRACT

An information handling system plays audio provided from a portable audio device at an information handling system audio subsystem in operating and powered down states of the information handling system. In the operating state, digital audio information is communicated from the portable audio device through a serial link for rendering at the information handling system into an analog audio signal presented by the audio subsystem. In the powered down state, digital audio information is rendered at the portable audio device and communicated as an analog audio signal through the serial link to the information handling system. A system module at the information handling system selectively switches the serial link to interface with the audio subsystem and play the analog signal as audible sounds. The system module supplies power to the audio subsystem to support playing the analog signal with the information handling system in the powered down state.

13 Claims, 4 Drawing Sheets

SYSTEM AND METHOD FOR REMOTE USE OF INFORMATION HANDLING SYSTEM AUDIO COMPONENTS

BACKGROUND OF THE INVENTION

1. Field of the Invention

The present invention relates in general to the field of information handling system interaction with remote devices, and more particularly to a system and method for remote use of information handling system audio components.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often used as personal entertainment devices that store and play multimedia files, such as MP3 audio files. The hard disk drives typically built into information handling systems are capable of storing and playing substantial multimedia libraries. Information handling systems generally support speakers to play audio and a display to present video images from stored multimedia files. Portable information handling systems integrate a power source, the speakers and the display into a common chassis so that users may carry entertainment with them. Although portable information handling systems provide a versatile entertainment device, in some instances users desire an even smaller profile device to play audio. Portable audio devices have a mass storage device to store compressed audio files, such as MP3 files, and minimal processing capability to process the stored audio files into audio signals for use by a headset and to coordinate storage and retrieval of audio files through a small integrated display. Such audio devices are commonly called MP3 players although other types of file compression protocols are often supported. Since audio players generally have relatively small mass storage devices, users often manage multimedia libraries on a desktop or notebook information handling systems and connect audio players to the multimedia library to select files for download to the audio player. Audio players typically connect to the information handling system through a serial link, such as a USB link, with management applications running on the device and the system coordinating communication across the link.

In some instances, users desire to interface a portable audio device with an information handling system to play audio over the information handling system's speakers. With power on both the information handling system and the portable device, the information handling system can download audio files from the mass storage device of the audio device and process the audio files with the information handling system's CPU, chipset and memory. A disadvantage to this approach is that the information handling system uses a substantial amount of power, which can drain the internal battery of a portable information handling system. Some power savings is possible if components are powered down that are not needed for processing the audio file, however, the components needed to process the audio files tend to consume greater amounts of power, such as the CPU, memory, hard disk drive, chipset and audio subsystem. As an alternative, a portable information handling system may have a separate audio processing system that operates with the main processing components powered down. The separate audio system interfaces with the portable audio device to retrieve and play audio files from the audio device mass storage using the information handling system audio sound system and reduces information handling system power consumption by powering down most processing components. However, inclusion of the separate audio system adds considerable expense to the information handling system.

SUMMARY OF THE INVENTION

Therefore a need has arisen for a system and method which uses an information handling system audio subsystem to play audio files retrieved from a portable audio device.

In accordance with the present invention, a system and method are provided which substantially reduce the disadvantages and problems associated with previous methods and systems for presenting audio information at an information handling system. A serial link is used to communicate digital audio information from a portable audio device to an information handling system in an operating state so that the audio information is rendered and presented at the information handling system. At power down of the information handling system, the portable audio device renders the digital audio file to create an analog audio signal that is communicated over the serial link for presentation with the information handling system audio subsystem.

More specifically, an information handling system has plural processing components that cooperate to render and present digital audio information as audible sound from speakers of an audio subsystem. Digital audio files are retrieved from a remote portable audio device through a serial link, such as a USB cable. Retrieved digital files are rendered by the information handling system CPU and related components to generate an analog audio signal for use by the audio subsystem. Upon transition of the information handling system from an operating state to a powered down state, the portable audio device transitions from sending the audio file in a digital format over the USB cable to render the digital information to send an analog audio signal over the USB cable. For example, a player module at the portable audio device switches an analog audio signal to interface with the USB cable and a system module at the information handling system switches the analog audio signal to interface directly with the audio subsystem. At transition of the information handling system from the powered down state to an operating state, the player module switches the analog audio signal from the USB cable so that digital audio information is sent over the USB cable, and the system module switches the information to proceed to the CPU rather than the audio subsystem. A synchronizer manages transitions so that the audio information is rendered from the same playback state at each transition as was provided by the previous rendering.

The present invention provides a number of important technical advantages. One example of an important technical advantage is that audio files retrieved from a portable audio device are played at an information handling system audio subsystem with other power consuming components of the information handling system powered down. Sending an audio analog signal processed at the portable audio device through a serial link provides the information handling system audio subsystem with a speaker signal without processing of the audio file at the information handling system so that the CPU, memory, hard disk drive and chipset may remain powered down. Remote processing at the portable audio device to create the analog signal supports playing audible sounds without a separate audio processing system within the information handling system. Automatic detection of the portable audio device at the information handling system and the state of audio files being played simplifies end user selection of playing audible music at the information handling system from the portable audio device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Communication of an analog audio signal from a portable audio device to an information handling system over a serial link allows use of audible speakers at the information handling system without requiring power to many of the information handling system components for rendering a digital audio file. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
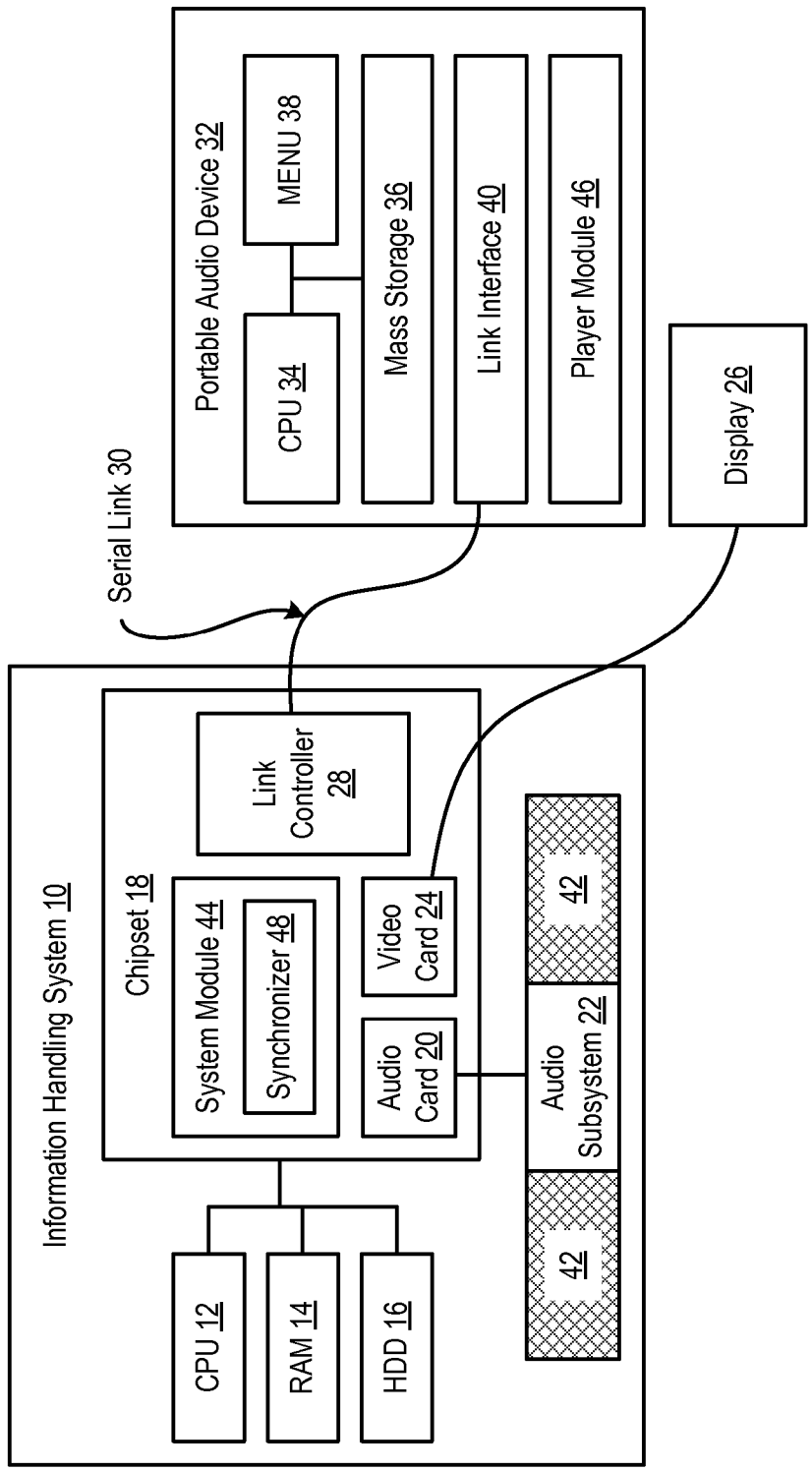
FIG. 1 depicts a block diagram of an information handling system and portable audio device operable to selectively communicate an analog audio signal across a serial link.

Referring now to FIG. 1, a block diagram depicts an information handling system and portable audio device operable to selectively communicate an analog audio signal across a serial link. Information handling system 10 includes a variety of processing components to process information, such as a CPU 12, RAM 14, a hard disk drive 16 and a chipset 18. For example, CPU 12 retrieves audio files having a compressed digital format, such as MP3 files, from hard disk drive 16 and renders the audio digital files in cooperation with an audio card 20 of chipset 18 to provide an analog audio signal to audio subsystem 22 for presenting the audio information as audible sounds. Similarly, CPU 12 renders visual information in cooperation with a video card 24 to present visual information at a display 26. In addition to locally stored audio information, a link controller 28 supports communication with remote storage devices through a serial link 30 to retrieve audio files for rendering by CPU 12. For example, a portable audio device 32, such as an MP3 player, has a CPU 34 to render audio files stored in a mass storage 36 as selected through a local menu 38. Portable audio device 32 includes a link interface 40 so that information handling system 10 can retrieve digital audio files from mass storage 36 for rendering at the information handling system.

Portable audio device 32 generally provides an analog audio signal to a headset for presentation to a user and generally does not include speakers for audible play. However, by interfacing portable audio device 32 with information handling system 10 through serial link 30, CPU 12 retrieves digital audio files from mass storage 36 for rendering at information handling system 10 to play audible sound from speakers 42. Using information handling system 10 in this manner to play digital files from mass storage 36 uses most of the processing components and, thus, tends to draw a significant amount of power, which is detrimental to battery life in portable systems. In order to reduce power consumption of information handling system 10, a system module 44 and player module 46 cooperate to transition audio information sent over serial link 30 from a digital format to an analog format. Player module 46 has CPU 34 render the digital audio file to an analog format, such as is used to communicate audio analog to a headset, and switches link interface 40 to send the analog audio signal instead of a digital signal. System module 44 switches communication from link 30 to proceed directly to audio subsystem 22 and provides for continuation of power to audio subsystem 22 at power down of information handling system 10. Communication of the analog audio signal directly to audio subsystem 22 allows audible play of the audio file without using information handling system 10 components to render the file, thus substantially reducing power consumption. At power up of information handling system 10, system module 44 and player module 46 cooperate to resume transfer of the digital audio file through link 30 for rendering at information handling system 10. A synchronizer 48 associated with system module 44 tracks the playback state of the audio file during transitions to maintain a seamless audio playback during transitions. System module 44 and player module 46 are hardware, firmware and/or software components that may be distributed between information handling system 10 and portable audio device 32.

Figure 2:
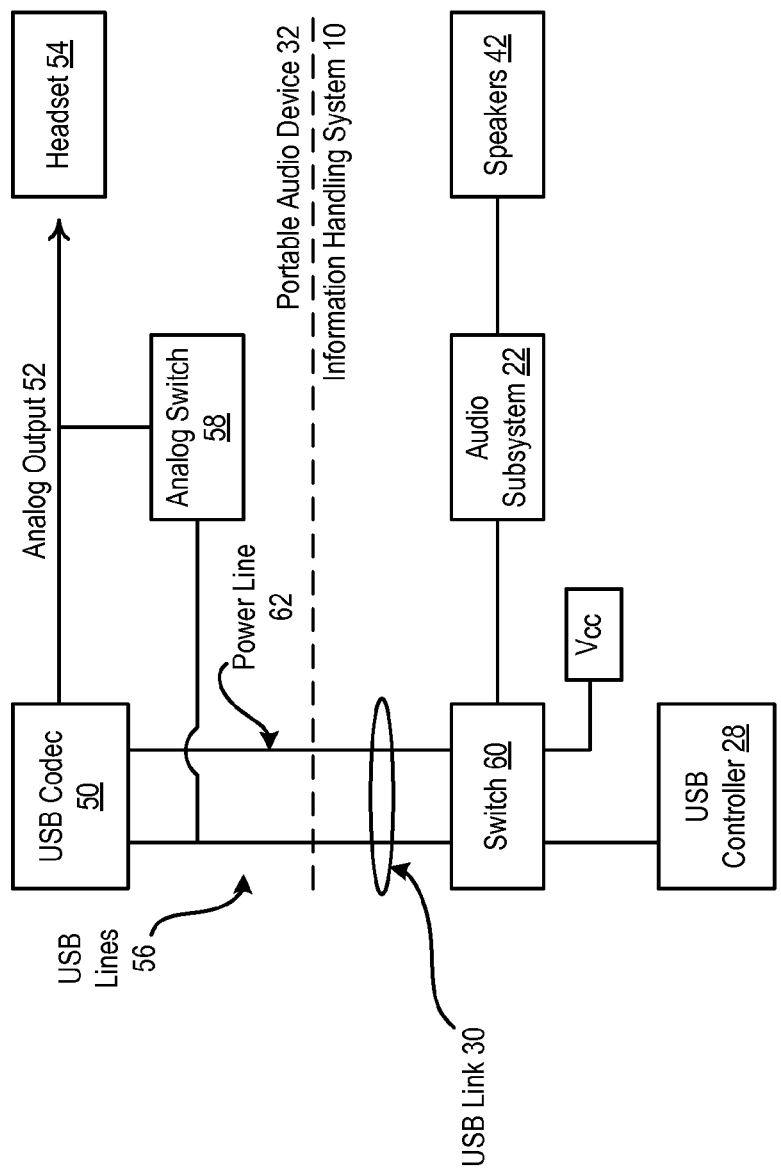
FIG. 2 depicts a block diagram of a system for communicating analog information across a USB link.

Referring now to FIG. 2, a block diagram depicts a system for communicating analog information across a USB link. A USB CODEC 50 codes and decodes audio information to generate an analog output 52 for use by a headset 54. USB CODEC 50 also communicates digital audio information through USB lines 56 of USB link 30 for communication to USB controller 28. With information handling system 10 in an operating state, digital audio information communicated to USB controller 28 is forwarded to the CPU and related components for rendering. With information handling system 10 in a powered down state, such as suspended or standby states, an analog switch 58 interfaces analog output 52 with USB lines 56 so that decoded analog audio information is communicated to information handling system 10. A switch 60 at information handling system 10 interfaces the analog audio signal directly to audio subsystem 22 for presentation by speakers 42. By having the audio information decoded at portable audio device 32, only limited power is drawn by components on information handling system 10 to play audible audio at speakers 42. Menu selection and control of digital audio file selection are managed through the menu of portable audio device 32. Transition of information handling system 10 between operating and powered down states is communicated through manipulation of power settings on power line 62, such as by toggling power or issuing a power on reset. Transition of USB lines 56 between communication of analog or digital audio information is managed by selection of the positions for switches 58 and 60.

Figure 3:
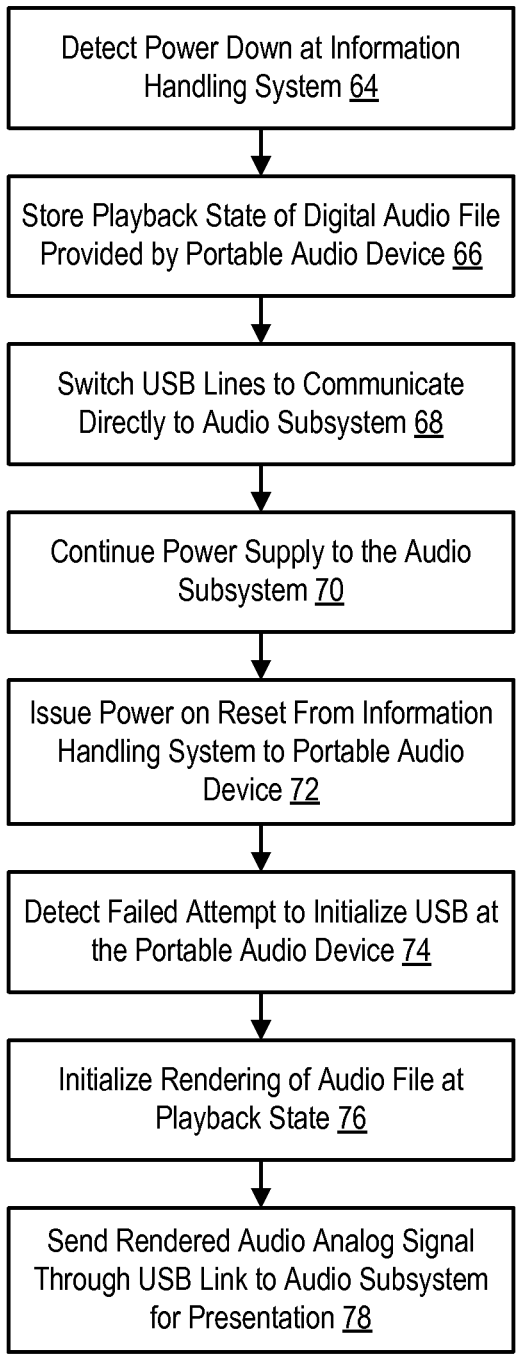
FIG. 3 depicts a flow diagram of a process for transitioning a USB link to communicate an analog audio signal from a portable audio device to an information handling system.

Referring now to FIG. 3, a flow diagram depicts a process for transitioning a USB link to communicate an analog audio signal from a portable audio device to an information handling system. At step 64, power down of the information handling system is detected, such as by a suspend, standby or off request. At step 66, the playback state of digital audio files currently provided from the portable audio device to the information handling system is stored, such as the content name and playback location. At step 68, the USB lines are switched to communicate directly to the audio subsystem, such as an audio amplifier, instead of to the USB controller. At step 70, power is continued to the audio subsystem while other components are powered down, such as through BIOS implementation of a suspend or standby state. At step 72, upon completion of the power down sequence, the USB power line is toggled to initiate a power on reset from the information handling system to the portable audio device. At step 74, the portable audio device responds to the power on reset by attempting to look for a USB initialization sequence. Failure by the portable audio device to detect the USB initialization sequence results in setting up the portable audio device to send analog audio signals through the USB lines. At step 76, rendering of the digital audio file from its playback state is initiated at the portable audio device and, at step 78, the rendered audio analog signal is sent through the USB link to the audio subsystem for presentation at the information handling system.

Figure 4:
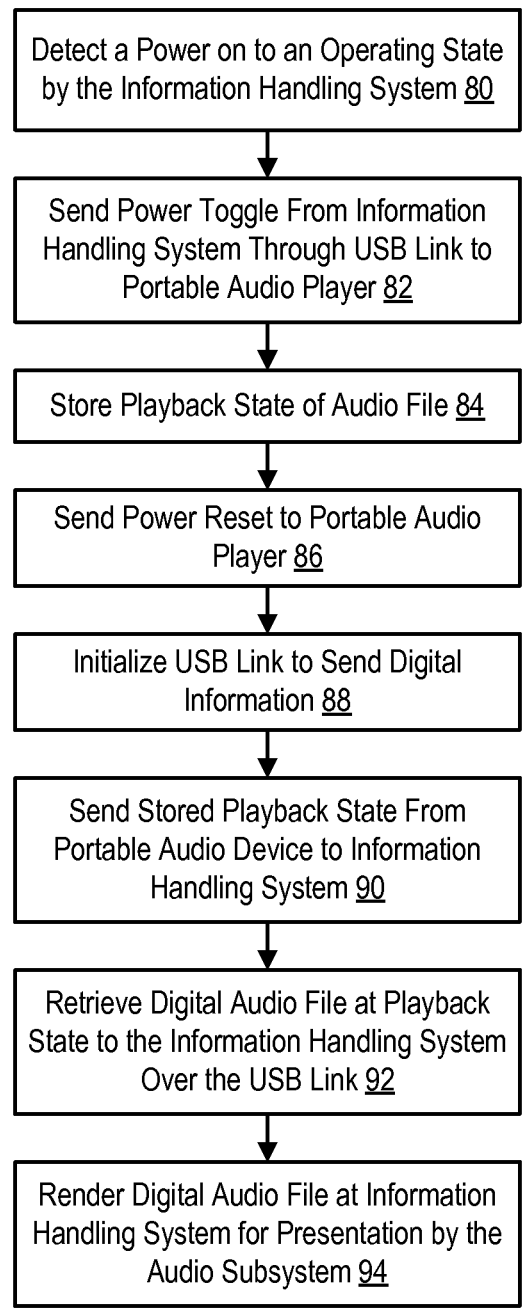
FIG. 4 depicts a flow diagram of a process for transition from communication of the analog audio signal to communication of digital audio information for rendering at the information handling system.

Referring now to FIG. 4, a flow diagram depicts a process for transition from communication of the analog audio signal to communication of digital audio information for rendering at the information handling system. The process begins at step 80 with detection of a power on from a power down state to an operating state by the information handling system. At step 82, a power toggle is sent from the information handling system to the portable audio device through the USB link to indicate a change in power state of the information handling system. At step 84, the portable audio device stores the playback state of the audio file currently sent over the USB link as an analog audio signal. At step 86, a power on reset is sent to the portable audio device to initialize the USB link at step 88 so that the audio file can be sent as a digital file over the USB link. At step 90, the stored playback state is sent from the portable audio device to the information handling system, which, at step 92 retrieves the digital audio file at the playback state over the USB link. At step 94, the digital audio file is rendered at the information handling system from the playback state for presentation by the audio subsystem.

Although the present invention has been described in detail, it should be understood that various changes, substitutions and alterations can be made hereto without departing from the spirit and scope of the invention as defined by the appended claims.

What is claimed is:

1. A method for presenting audio information at an information handling system audio subsystem, the method comprising:
   interfacing the information handling system with a portable audio device through a serial link;
   processing digital audio files at the portable audio device to generate an analog audio signal;
   sending the analog audio signal through the serial link to the information handling system audio subsystem;
   presenting the analog audio signal as audible sound from the audio subsystem; and
   powering down a CPU of the information handling system.

2. The method of claim 1 further comprising:
   powering up the CPU of the information handling system;
   stopping the processing digital audio files and the sending the analog audio signal;
   sending the digital audio file as digital information from the portable audio device to the information handling system though the serial link;
   processing the digital audio file with the CPU to create an analog audio signal; and
   presenting the analog signal as audible sound from the audio subsystem.

3. The method of claim 2 wherein the serial link comprises a USB link.

4. The method of claim 2 further comprising:
   monitoring the playback state of the digital audio file at the portable audio device; and
   sending the playback state from the portable audio device to the CPU;
   wherein processing the digital audio file with the CPU further comprises processing the digital audio file at the playback state.

5. The method of claim 4 wherein sending the playback state from the portable audio device to the CPU further comprises:
   sending a power on reset from the information handling system to the portable audio device;
   detecting the power on reset at the portable audio device;
   switching an analog output of the portable audio device from an interface with the serial link; and
   sending the playback state through the serial link.

6. The method of claim 1 wherein sending the analog audio signal through the serial link further comprises:
   switching an analog output of the portable audio device to interface with the serial link.

7. The method of claim 1 wherein the digital audio file comprises an MP3 file.

8. An information handling system comprising:
   a CPU operable to process information;
   memory interfaced with the CPU and operable to store the information;
   a device interfaced with the CPU and operable to perform a predetermined function with the information;
   a power supply operable to supply power to the CPU, the memory and the device;

a serial link interfaced with the CPU and operable to connect through a serial link cable with an external device to communicate digital information between the CPU and the external device; and a system module interfaced with the serial link and the device, the system module operable to selectively interface digital information received over the serial link with the CPU and analog information received over the serial link with the device.

9. The information handling system of claim 8 wherein the device comprises an audio subsystem operable to play audible sound from analog information, and wherein the system module selectively interfaces digital audio information received over the link with the CPU for rendering an analog audio signal to present at the audio subsystem or interfaces analog audio information received over the link with the audio subsystem for presenting the analog audio signal.

10. The information handling system of claim 9 wherein the system module is further operable to:

detect transition to a power down state at the information handling system;

direct power from the power supply to the audio subsystem for use in the power down state; and interface the audio subsystem with serial link to play analog audio signals by the audio subsystem in the power down state.

11. The information handling system of claim 9 wherein the system module is further operable to:

detect transition from the power down state to an operating state;

communicate a request at the serial link to send digital audio information instead of analog audio information; and interface the CPU with the serial link to render the digital audio information.

12. The information handling system of claim 11 wherein the system module communicates the request to send digital information by performing a power on reset at the serial link.

13. The information handling system of claim 12 wherein the serial link comprises a USB link.

* * * * *